Sept. 24, 1935.  B. M. LEECE  2,015,600

GENERATOR

Filed Aug. 1, 1933

INVENTOR
BENNETT M. LEECE

Kuis Hudson & Kent
ATTORNEYS

Patented Sept. 24, 1935

2,015,600

UNITED STATES PATENT OFFICE 2,015,600

GENERATOR

Bennett M. Leece, Cleveland, Ohio, assignor to The Leece-Neville Company, Cleveland, Ohio, a corporation of Ohio Application August 1, 1933, Serial No. 683,153

11 Claims. (Cl. 171—229)

This invention relates to generators, and particularly to variable speed generators such as are employed on various kinds of motor driven vehicles for starting and lighting purposes.

Two types of generators, in so far as the voltage control is concerned, are commonly employed on motor driven vehicles, one having an outside vibrating regulator and commonly termed a generator having voltage regulation, and the other being a generator, such as a third brush generator, wherein the voltage regulation occurs internally of the machine. Both types are used very extensively, and, although a much closer regulation is obtained with a voltage regulated machine, some motor vehicles are equipped with generators having no voltage regulation (external vibrating regulator). Whether or not generators having voltage regulation are employed depends to some extent on the size and use of the vehicle, although it is generally recognized that voltage regulated generators are superior from the standpoint of performance and are generally more desirable than unregulated generators. In many instances, the voltage regulated generators are not employed, largely because of the added cost of the regulators. With the advent of certain improvements in automobile construction and equipment, as, for example, free wheeling, the need for voltage regulated generators has increased, but nevertheless, on account of the keen competition existing in the automobile field, many automobile manufacturers, though recognizing the need for voltage regulated generators on their vehicles, adhere to the unregulated type, to the detriment of the lamps and the battery.

The object of the present invention is to provide a generator or a generating system which can function either as an unregulated machine or as a regulated machine by the removal or application of a regulator, as a unit, without manually changing any of the connections.

It is the aim of the invention to provide a regulator in the form of a unit which can be slipped into an appropriately provided space or chamber in the generator, which will be designed and built to receive the regulator unit, so that the generator can be very quickly and easily equipped with a regulator should the customer desire it. Conversely, should it be desired to eliminate the regulator, as, for example, should it by chance fail to operate in the intended manner, it can be removed. In accordance with the present invention, such installation or removal of the regulator can be accomplished without manually changing any of the electrical connections.

The invention may be briefly summarized as consisting in certain novel combinations and arrangements of parts which will be described in the specification and set forth in the appended claims.

In the accompanying sheet of drawing, wherein I have shown an embodiment of my invention which operates effectively:

Figure 1:
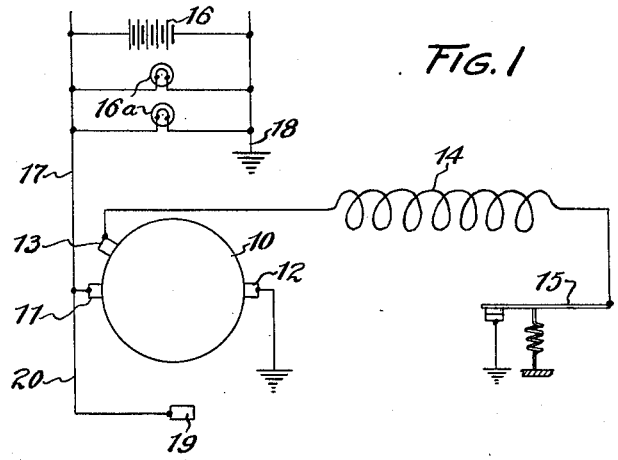
Fig. 1 shows an unregulated generator, in this instance of the third brush type, but initially constructed to receive or accommodate and to properly function with a regulator when the application of the regulator is desired.
Figure 2:
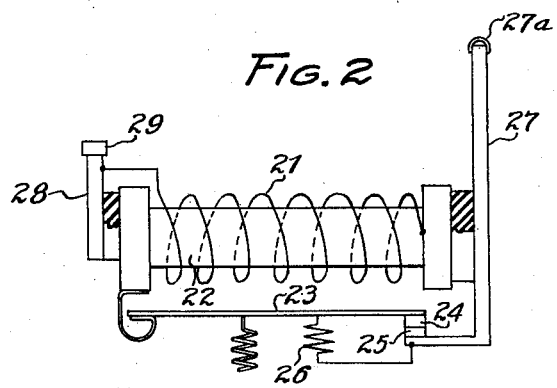
Fig. 2 shows a regulator which may be utilized with the generator of Fig. 1 to make the machine a voltage regulated one.

Referring now to the drawing, 10 represents the armature of the generator, having main brushes 11 and 12 and a third brush 13. One of the main brushes, brush 12, is here shown as grounded. The field winding 14 is shown connected to the third brush 13 and through a switch 15 to ground. The load is here shown as consisting of a battery 16 and lamps 16a, one side of the load being connected by conductors 17 to the main brush 11 and the other side 18 being grounded and therefore being connected to the other main brush 12. Additionally, the generator has a contact 19 connected by a conductor 20 to main brush 11, contact 19 and conductor 20 being unused when the machine is functioning as an unregulated generator. It will be seen from Fig. 1 that the generator shown is a conventional representation of a usual third brush generator functioning in a starting and lighting system in the customary manner except for the presence of the switch 15 which is normally closed and remains closed as long as the machine is functioning as a third brush machine.

The regulator which is utilized in accordance with the present invention to convert the generator of Fig. 1 to a voltage regulated generator may, with the exception of some details to be referred to, be of the conventional type. For example, it may consist of a single coil 21 wound on a magnet core 22 and adapted to vibrate a blade 23 carrying a contact 24 adapted to engage a stationary contact 25 to short-circuit the resistance 26. On the other hand, the regulator may have two or more coils, such as shown in my prior Patent No. 1,540,698. This regulator is adapted to be slipped into a suitable part of the generator frame, as, for example, in a pocket or recess under the commutator, somewhat as shown in my prior Patent No. 1,701,047. This regulator, in order to adapt it for the purposes of the present invention, is provided with two details not provided on regulators generally, and one of these details is a suitable device to open the switch 15 and at the same time establish a connection from the field winding through the contacts 24 and 25 or through the resistance 26 to ground and therefore to brush 12. This is shown as being in the form of an arm 27 which, when the regulator is applied to or slipped into the generator, engages the movable blade of the switch 15, separates it from the stationary contact which it normally engages, and establishes the desired connection to the contacts or resistance and then to ground.

The other detail is a suitable device which, when the regulator is applied to the generator, will connect one end of the winding to the contact 19 and brush 11, the other end of the winding being grounded on the magnet frame. It will be seen, therefore, that when the regulator is applied to the generator of Fig. 1 in such a way that the switch 15 will be opened and the field winding connected to the conductor 27 and that the conductor 28, with its contact 29, will be connected to the contact 19, and if at the same time the core or frame of the magnet is grounded, as it can readily be when applied to the generator, the generator will then become a voltage regulated machine for the reason that the regulator winding 21 will then be connected across the main brushes 11 and 12 by virtue of the fact that one end is grounded and the other is connected by way of the conductor 28, contact 29, contact 19, and conductor 20 to brush 11. At the same time, the normal connection of the field winding from brush 13 through the switch 15 and direct to ground is broken, and the field winding, by reason of the opening of the switch 15 and the engagement by the contact 27a on the end of the conductor or arm 27, is now connected to ground and therefore to brush 12 through the contacts 24 and 25 or resistance 26, the circuit of the field winding being completed to brush 12 by reason of the fact that the core or frame of the regulator is grounded on the generator. Thus the ampere turns for the field winding will be constantly varied by the resistance 26 being cut into and out of its circuit, and the ampere turns will be reduced as the voltage tends to rise. Accordingly, the generator, with the regulator added, will function as an ordinary voltage regulated third brush machine. It will be noted that when the regulator is removed the contact 19 again ceases to function and the switch 15 is closed so as to complete the field circuit again through switch 15 direct to ground.

As stated above, by the mere application of the regulator the generator becomes a voltage regulated generator, or by the mere act of removal of the regulator, it is again restored to a straight third brush or unregulated machine, and these changes are effected without making any manual changes in the connections.

Figure 3:
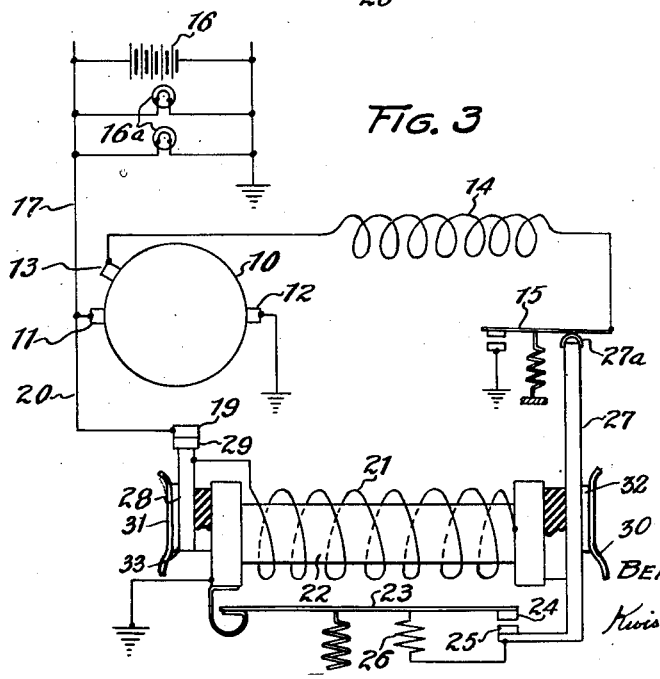
Fig. 3 shows the circuit connections when the regulator is applied and the machine is functioning as a voltage regulated machine.

The regulator may be detachably retained on the generator by any suitable means such as by providing suitable spring clips or retainers 30 and 31. These spring clips are shown in the diagram of Fig. 3 and may be mounted on either the regulator itself or the generator. The retaining clips 30 and 31 cooperate respectively with the arms 27 and 28 of the regulator but are insulated from the arms by suitable insulators 32 and 33.

While I have illustrated herein a third brush machine, the invention is not at all confined to a machine of that type, but a third brush machine is illustrated as that is the type of unregulated machine commonly employed on motor vehicles of various kinds. It will be obvious that this invention will function with a straight shunt machine, in which event the field winding, instead of being connected to a third brush 13, will be connected to the main brush 11, and all other connections will remain the same.

It will be seen, therefore, that motor vehicles may be equipped with generators of the unregulated type, but having provision for receiving a regulator such as described, thus making it possible for the motor vehicle salesman to suit the needs or wishes of the customer by readily applying a regulator to the generator, without liability of mistakes being made in the connections, to convert it to a regulated machine, and, if for any reason, as, for example, trouble with the contacts of the regulator, the latter should fail to function properly, the user has simply to slide out or otherwise remove the regulator and the machine is again automatically restored to one which will function properly as a straight third brush or other unregulated machine.

While I have shown only one embodiment of the invention, changes may be made wthout departing from the spirit and scope of the invention.

Having thus described my invention, I claim:

1. In combination, a generator having connections enabling the same to operate as a non-regulated machine, a vibrating voltage regulator unit, and cooperating means on the generator and regulator unit whereby the latter is adapted to be applied to the generator to automatically convert it to a voltage regulated machine and is removable therefrom for automatically converting it to one functioning as a non-regulated machine.

2. In combination, a generator unit capable of operation as an unregulated machine, a vibrating voltage regulator unit, and means coacting with the generator unit and the vibrating regulator unit whereby, on applying the regulator unit to the generator unit, the generator unit is automatically converted from an unregulated to a regulated generator.

3. In combination, a generator having circuit connections enabling the same to operate as an unregulated machine including a field winding connected across brushes of the generator, and a vibrating regulator applicable to the generator, means coacting with the generator and the regulator to enable the latter to be electrically connected to the generator by the bodily movement of the regulator and without otherwise manually changing the connections.

4. A generator having circuit connections enabling the same to operate as an unregulated machine including a field winding connected across brushes of the generator, and a vibrating regulator comprising a magnet winding and having means whereby upon the bodily movement of the regulator into the generator the field winding is connected across said brushes through the regulator and the regulator winding is connected across brushes of the generator.

5. A generator having a field winding connected across brushes through a switch, and a vibrating regulator having a winding and vibratory contacts and having means whereby the switch is opened to connect the field winding across the brushes through the regulator by the application of the regulator to the generator.

6. A generator having a field winding connected across brushes of the generator through a switch, and a regulator of the vibratory type comprising a magnet with a winding and vibratory contacts and having means for opening the switch and connecting the field winding through the regulator when the unit is applied to the generator.

7. A generator having circuit connections enabling the same to operate as an unregulated machine including a field winding connected across terminals of the generator and also having a normally inactive regulator contact, and a vibrating regulator comprising a magnet coil and a vibratory contact and having means engaging said normally inactive contact of the generator when the regulator is applied to the generator so as to establish a circuit across terminals of the generator through the magnet winding.

8. In combination, a generator having a field winding connected across terminals of the generator through a switch and having a normally inactive regulator contact connected to a terminal of the generator, and a vibrating regulator comprising a magnet winding and vibratory contacts and having means for engaging one element of the switch so as to connect the field winding to the first named terminals through the regulator and having a contact for engaging said normally inactive regulator contact to connect the magnet winding to the terminals of the generator.

9. In combination, a generator having a field winding connected across terminals of the generator through a switch and having a normally inactive regulator contact connected to a terminal of the generator, and a vibrating regulator comprising a magnet winding and vibratory contacts and having means for engaging one element of the switch so as to connect the field winding to the first named terminals through the regulator and having a contact for engaging said normally inactive regulator contact to connect the magnet winding to the terminals of the generator, said changes in the circuit of the field winding and the connection of the magnet winding to the generator being established by the application of the regulator to the generator.

10. In combination, a generator having a field winding connected across terminals of the generator through a switch and having a normally inactive regulator contact connected to a terminal of the generator, and a vibratory regulator having a pair of contacts for engagement respectively with an element of said switch and said inactive regulator contact for establishing a readily detachable operative connection between the regulator and the generator.

11. In combination, a generator having circuit connections enabling the same to operate as an unregulated machine, a vibrating voltage regulator, and means detachably mounting the regulator on the generator including means effective for establishing separable operative electrical connection whereby the regulator is adapted to control the voltage of the generator when mounted thereon and to be disconnected from the generator without disturbing its generating function.

BENNETT M. LEECE.